United States Patent Office 3,125,107
Patented Mar. 17, 1964

3,125,107
PROCESS OF CONVEYING MOLTEN POLYMERS
Stanley David Wood, Kingston, Ontario, Canada, assignor, by mesne assignments, to E. I. du Pont de Nemours and Company, Wilmington, Del., a corporation of Delaware
No Drawing. Filed Aug. 23, 1961, Ser. No. 133,289
Claims priority, application Canada Aug. 25, 1960
5 Claims. (Cl. 137—13)

This invention relates generally to a process of shutting down, cleaning, and putting back into service a polymer transfer line and, more particularly, a transfer line through which a molten gel-susceptible polymer such as a polyadipamide is conveyed.

Gel from polyadipamides can be defined as a product of polymer degradation and is presumably produced by the cross-linking of polymer molecules. Polyadipamide gels are unfusible, solid masses which are not entirely soluble. It is known that gel formation can be caused by excessive temperatures or prolonged heating and occurs chiefly in stagnant areas of a transfer line. Gel clogs spinneret packs, extruders, pipe lines, pumps, instrument connections, and otherwise seriously interferes with the processing of polyadipamides.

In the design of transfer lines presently in use for conveying molten polyadipamides, every attempt is made to prevent gel formation of the polymers. Since such polymers can only be held in hot pipes for a limited length of time before gelling, there are no dead spots, or blind ends. Stagnant areas, spaces or corners where low velocity flow could occur in the lines are minimized. Transfer of heat to the polymers is carefully controlled.

Nevertheless, when a molten polyadipamide is flowing through a heated line, there are usually locations in the line where gel formation occurs. This gel can cause major processing problems if it is not removed from time to time.

According to known procedures, gel is removed by shutting off the flow in a polymer transfer line and dismantling the entire line; the insulation has to be removed, the pipes have to be taken apart and then sent away for gel removal by either sand-blasting or furnace cleaning techniques. After the cleaning operation, the line is re-assembled, reinsulated, pressure tested, reheated and the production which was stopped is started up again. This procedure requires a considerable amount of labor, results in considerable loss of production and accordingly is quite expensive.

This procedure must be followed also, even though there is no gel present, when at the startup of production some critical piece of equipment fails, as frequently happens. Likewise, when ordinary overhaul repairs are required or when pipeline branches are to be added or removed, the same procedure must be followed.

The dismantling procedure for shutting down and cleaning polyadipamide transfer lines was adopted because gel attaches itself to the inside surfaces of the transfer line and previously could not be otherwise removed. On cessation of flow at operating temperatures, the transfer line readily builds up a layer of gel on its inner surface and, when often repeated or held in this condition for prolonged periods, the gel layer markedly restricts the cross-sectional area of the pipe.

Many polymers, for example, polycaproamide, are not gel-susceptible. A process wherein the polyhexamethylene adipamide in a system is displaced by polycaproamide, flow is stopped and heating is discontinued, whereupon the polycaproamide solidifies in the system, has been disclosed by Proctor in U.S. Patent No. 2,835,925. When heat is reapplied, slow melting has no adverse effect, flow can be resumed, and new polyhexamethylene adipamide is used to displace the polycaproamide; the characteristics of the nylon then produced are the same as before shut-down. Proctor's process is applicable only for a planned shutdown which is a much less frequent occurrence than the inevitably numerous other shutdowns. Proctor further discloses that in a like system, with discontinuation of heat, stoppage of flow, and resumption of heating, but no displacement with polycaproamide, thorough cleaning is required before extrusion can be resumed because of extensive gel deposits throughout the system.

The invention has as its most important objective the provision of an effective process for shutting down a polyadipamide transfer line in which process the above outlined disadvantages are overcome. A further object is to provide process refinements whereby the flow in a polyadipamide transfer line is stopped without the later necessity of dismantling the line for clean-up. A still further object is to provide a process for cleaning a polyadipamide transfer line. Another important object is to provide a process for cleaning a polyadipamide transfer line without using any non-identical agent for cleaning. A more specific objective of this invention is to provide a process in which the flow of a polyadipamide can be stopped in the polymer transfer line and subsequently resumed without the necessity of dismantling the entire line for a cleaning operation.

These and other objects are accomplished in a process wherein the flow of a molten, gel-susceptible polymer, e.g., a polyadipamide, in a transfer line is stopped, its temperature is reduced to a point below the melting point and flow is resumed after reheating to remelt the polyadipamide. It has been found, on examining material removed from the transfer line, that the gel which had previously formed in the transfer line is unexpectedly pulled away from the inner walls, evidently by the contraction of the material as it becomes solid. This characteristic of contraction is utilized advantageously when flow is resumed. In effect, the gel, being now free to move again in the line, necessarily is forced out by the new polymer passing into and through the line. The time of retention and contraction should be long enough to effect a substantially complete pulling away of gel from the walls. The elapsed time of reheating should be long enough for the polymer to become sufficiently fluid again and short enough to prevent more gelation.

*Example I*

A polymer transfer line supplying 16 spinning positions with molten 66 nylon at approximately 280° C. was stopped by closing the transfer line supply valve. The vapor heat supply to the jackets of the transfer line was shut off and the condensate return line closed. Packs were removed from the spinning block. For ten days the line remained out of service, untouched, during which time its temperature dropped to about 30° C. On the tenth day the valves for the vapor heat supply to the jackets of the transfer line, and the condensate return, were opened. Within two hours the temperature in the transfer line returned to 280° C. and pumping was resumed. The 16 positions were progressively pumped out and each pack reinstated. Each position spun first-grade yarn one hour after pump-out.

In another instance, a common 66 nylon transfer line system with twelve spinning pumps was placed out of service. Fifty-three days later they all were returned to service in the manner specified above. There were no failures or leaks. The pump-out polymer ran clean within one-half hour and the first yarn that spun met first-grade requirements.

*Example II*

A 3½ inch diameter screw melter with transfer lines, supplying molten 66 nylon at approximately 290° C., was shut down. The valve on the transfer hopper was shut off and the screw heater selector switch was set to off. The polymer pressure was allowed to level out at its lower value. The meter pumps were disengaged. The pressure on the vapor heat supply to the screw-melter and transfer line jackets was throttled, and screw speed was set at zero. Then the vapor heat supply valves and the condensate valves to the jackets were shut off. The polymer was allowed to cool for 3 days and the 66 nylon froze in the screw melter. On the fourth day the melter was reheated for 4 hours and started up with no operational difficulties, and acceptable spinning and drawing performances of the yarns produced were achieved. At least 5 more such shutdowns and startups were subsequently accomplished without difficulty on this same melter.

The double plug valve which is disclosed in copending Canadian application No. 798,641 permits an increased or decrease in the number of polymer spinning units without disruption of the over-all process of spinning the polymer. The task of cleaning the transfer line to the idle spinning units each time they are taken out of service can be avoided by adjusting such a valve in order to stop the flow of polymer to the indicated units, shutting down the heat supply to the idle transfer line and allowing the polymer therein to solidify. This modification is described in Example III. Cooling of the idle line is accelerated by drawing a vacuum on its heating jacket. The short section of the idle transfer line next to the valve is removed to facilitate cleaning of gel and solidified polymer from the valve discharge nozzle. Such solidified polymer must be removed in order to prevent gel formation at the nozzle due to the heat of the valve and also to prevent excessive heat loss from the valve to the cold transfer line. Before startup, the section (next to the valve) which was taken off is cleaned and replaced, the heat supply is turned on, and the idle line is brought to operating temperature. When the polymer remaining in the line is melted, the valve is opened to supply additional polymer and thereby clear remelted polymer containing gel from the transfer line.

*Example III*

A transfer line supplying 8 spinning units with molten 66 nylon was stopped by closing the transfer line supply valve. The idle vapor heat supply to the line was shut off and the condensate return line closed. The condensate or vapor in the transfer line heating jackets was removed by drawing a vacuum on the jackets. The transfer line was then allowed to cool to room temperature and the 66 nylon to solidify in the transfer line. During the cooling operation, at a temperature of approximately 120° C., a short length of jacketed line next to the transfer line supply valve was removed.

The flow in the idle transfer line was restarted by the following procedure. The short length of jacketed line next to the transfer line supply valve was replaced and the heat supply to the transfer line was turned on. Approximately six hours were required to bring the 66 nylon up to operating temperature which is approximately 280° C. The transfer line was held at this temperature for an hour before starting the spinning units in order to assure that all 66 nylon in the line was melted. The polymer supply valve was then opened and the spinning units started. The remelted 66 nylon, together with the gel contained in the transfer line, was pumped to waste until clear gel-free 66 nylon flowed from the units, which lasted approximately 10 minutes for the length of transfer line used in the example. The transfer line was throuoghly free of gel and normal spinning was then resumed.

The most critical time for this process is that spent on reheating the transfer line. If too much time is spent during reheating before flow is resumed, gelation will occur again. It should be noted that what is important is to pump out the gel and not necessarily to completely melt all the material within the transfer line. Sufficient melting does have to take place so that the largest unmelted mass is smaller than the smallest pipe diameter or flow path. A maximum of about 6 hours for reheating should not be exceeded, and a minimum time is that sufficient to melt enough polymer to commence pumping, which is a function of the ratio:

$$\frac{\text{large pipe diameter}}{\text{small pipe diameter}}$$

where the small pipe diameter is located downstream from the large pipe diameter; and as this ratio approaches 1, the minimum time approaches 1 hour, but as this ratio increases more than 1, the minimum time is a function of both the ratio and the cross-sectional area of the large pipe diameter in the transfer line.

For 66 nylon it is preferred to reduce the polymer temperature for the purposes of this process to below 250° C. and the temperature of the transfer line contents should be kept below 250° C. a sufficient length of time to permit complete freezing so that the gel can properly free itself from the transfer line inside surface. Reheating to 250° C. (which is below the melting point of 66 nylon) as long as 6 hours before pumping is helpful in order to get the pipe hot. Then the heating time to operating temperature (about 285° C.) should be held to a minimum. It should be noted that, for 66 nylon, no significant further degradation, or other deleterious chemical reaction, takes place even after 105 days retention at room temperature within the transfer line. Effectively, the material is in a vacuum-packed condition at room temperature, and therefore there is no degradation from heat, light, air, or moisture. Once flow of 66 nylon stops, lowering the temperature to below 250° C. should be carried out as quickly as possible. Immediately shutting off the supply of heat to the jacket of the line usually effects this criteria.

Since the accumulation of gel in the transfer line during a long period of use is the only reason for removing and burning-out or sand-blasting the line from time to time, with this process it is no longer necessary for the transfer line to be disassembled for cleaning purpose. It is now possible to free the line of gel by retaining the polymer in the entire transfer line which is to be cleaned. Once contraction occurs, the polymer may be made fluid again by reheating the line and then the fluid polymer, together with the gel, may be pumped out of the line to waste. No extraneous cleaning agents or solvents are used, so that the high quality of the yarn produced is regained at once.

Polyadipamides have been the polymers used in the examples and discussions, particularly polyhexamethylene adipamide (66 nylon), but it is apparent that the process of this invention is also applicable to the transfer of any other molten, gel-susceptible thermoplastic polymer. It is equally apparent that other changes, modifications and adaptations of the disclosed process may be accomplished without departing from the spirit of the present invention which is therefore intended to be limited only by the scope of the appended claims.

Having thus described the invention, what is claimed as new and desired to be secured by Letters Patent is:

1. A process of removing gel from a flow conduit for a polymer which tends to gel on the conduit wall when in the molten condition, said process comprising stopping the polymer flow, freezing the polymer in said conduit, subsequently remelting said polymer and pumping the remelted polymer together with the gel out of said flow conduit.

2. A process of removing gel from a heated flow line for a molten polymer which tends to deposit gel on the inner wall of the line, said process comprising stopping the polymer flow, turning off the heat supply to said line, allowing said polymer to solidify in said line, remelting said polymer, opening said line, and pumping the remelted polymer containing gel from said line.

3. A process of freeing a flow line for molten polyhexamethylene adipamide of gel comprising stopping the adipamide flow, freezing the adipamide in said line, subsequently remelting said frozen adipamide and pumping the remelted adipamide together with gel out of said flow line.

4. A process of freeing a flow line for a molten polymer containing a polyamide of the type which tends to deposit gel on the inner wall of the line, said process comprising stopping the polymer flow, freezing the polymer in said line, subsequently remelting said frozen polymer and pumping the remelted polymer together with any gel therein out of said flow line.

5. A process of freeing a flow line in which the flow of a molten polymer has been stopped, said polymer containing a polyamide of the type which tends to deposit gel on the inner wall of the line, said process comprising freezing the polymer in said line, subsequently remelting said frozen polymer and pumping the remelted polymer together with any gel therein out of said line.

References Cited in the file of this patent

UNITED STATES PATENTS

| | | |
|---|---|---|
| 2,683,073 | Pierce | July 6, 1954 |
| 2,729,538 | Hull | Jan. 3, 1956 |
| 2,835,925 | Proctor | May 27, 1958 |